Dec. 2, 1952  M. C. CARBONARO  2,620,132
REGULATING DEVICE FOR GAS RADIATORS
Filed June 21, 1947  4 Sheets-Sheet 1

INVENTOR:
MARKUS CLEMENT
    CARBONARO
BY:
Michael S. Striker
    agt

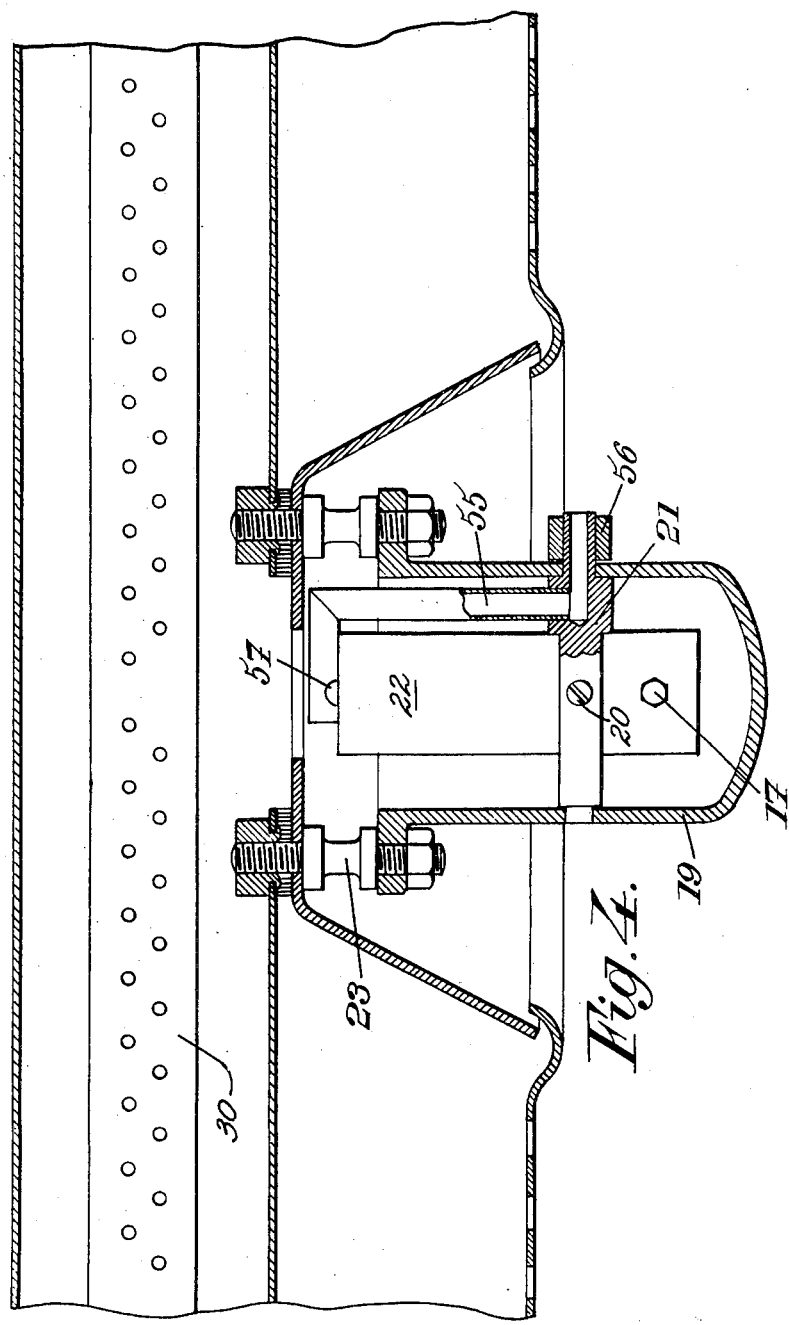

Patented Dec. 2, 1952

2,620,132

UNITED STATES PATENT OFFICE 2,620,132

REGULATING DEVICE FOR GAS RADIATORS

Marius Clement Carbonaro, Paris, France

Application June 21, 1947, Serial No. 756,271
In France December 12, 1946

5 Claims. (Cl. 236—1)

My present invention relates to regulating devices for gas heated radiators.

It is an object of my present invention to provide a regulating device adapted to be used with gas radiators of any desired type.

It is in the main object of my present invention to increase the safety and accuracy of operation of regulating devices of the above defined types, while at the same time reducing very appreciably their dimensions and costs due to great simplification of their construction.

In accordance with my present invention, a regulating device adapted to attain the above objects consists of a combination of all or some of the following elements:

a. A cock type valve for admitting the heating gas;

b. A readily dismountable filter arrangement protecting the entire regulating device against deposits of dust and similar particles contained in the heating gas;

c. A pressure regulator constructed so as to keep the gas pressure of the gas fed to the burner constant, irrespective of the gas pressure in the main gas pipe;

d. A safety valve combined with the above mentioned pressure regulator and constructed so as to automatically stop admission of gas to the burner if the gas pressure in the main conduit drops below a predetermined minimum pressure; this valve is adjusted so as to remain closed—even if the gas pressure rises again to its normal value—until the operator manually operates the restarting button mentioned below in order to reopen this valve; and e. A restarting push button automatically operated by the handle of the cock type valve mentioned under "a" and adapted to automatically reopen the safety valve each time the cock valve is manually operated by the operator; this push button is constructed so as to project into a cavity provided in the handle of the cock valve and arranged so that the safety valve mentioned above under "d" can freely operate and fulfill its proper function when the cock valve is in open position.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 4 is a sectional view of the lighting means on line 4—4 of Fig. 1; and

Fig. 5 is an elevational view of the lighting lever.

Figure 1:
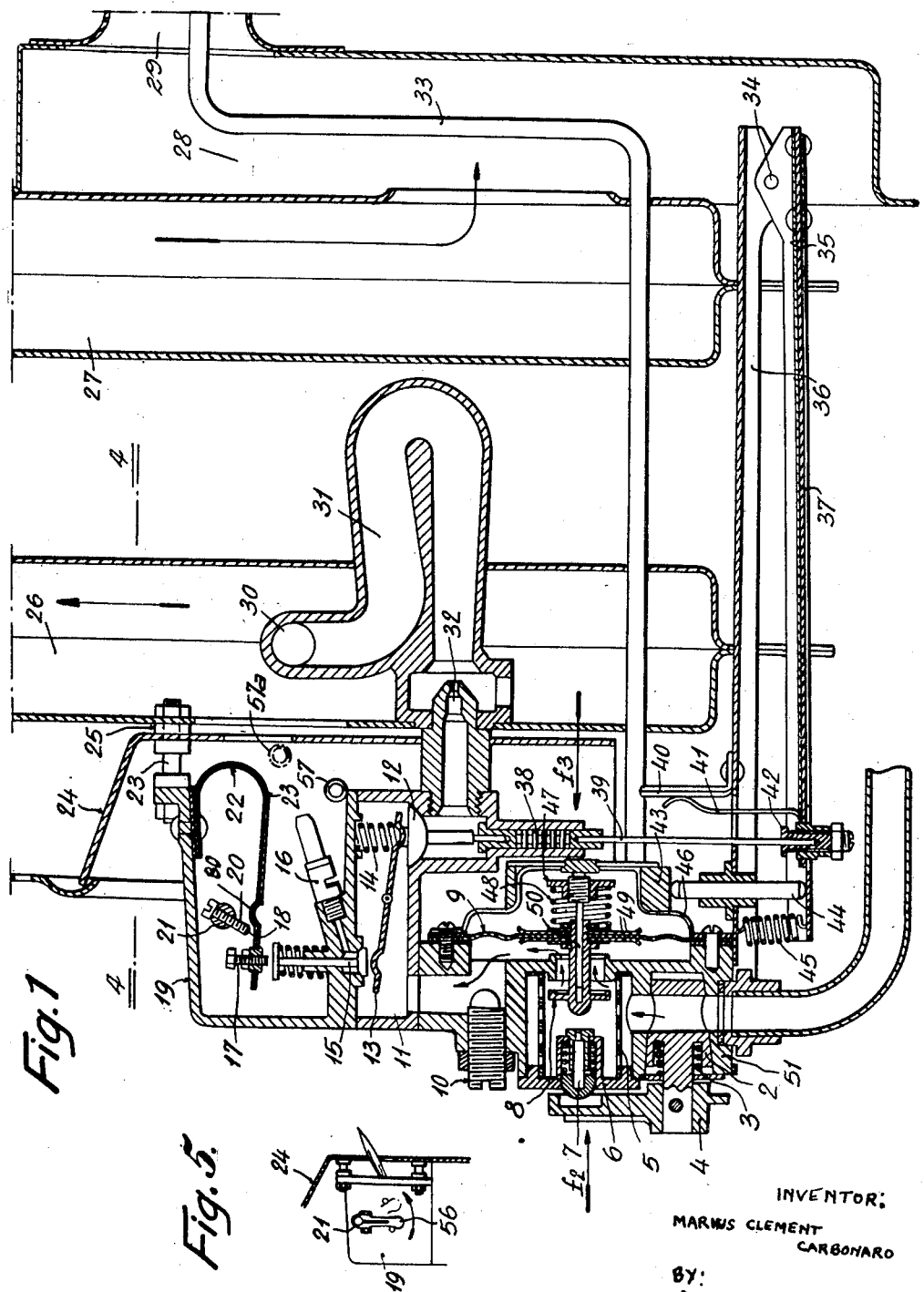
Fig. 1 is a vertical section through a regulating apparatus according to the present invention.

The regulating device shown in the drawings includes a gas pipe 1 supplying the heating gas. The supply of gas through this pipe is manually controlled by the cock type valve 2, proper tightness and fitting of which is assured by the spring 3.

The handle 4 of cock valve 2 is provided on its rear face with a cavity into which the hemispheric end portion of the restarting push button 7 projects when the handle of the cock valve is in operative position, i. e. when the valve is open as shown in Fig. 1.

The front wall of the regulating device is provided with a removable cover 6 which permits access for purposes of cleaning the filter 5 through which the gas passes before reaching valve 8 forming part of the pressure regulator. This valve 8 is supported by the flexible membrane 9 and combined with the so-called minimum safety valve 49 operating in opposite direction, as will be described farther below in detail.

After passage through filter 5 and valve 8, the gas enters the chamber 11 through a square-shaped duct, the cross section of which is controlled by the manually adjustable flow regulating screw 10.

The thus admitted gas is now adapted to feed the gas injector 32 injecting the gas into the combustion chamber and the pilot light 16; of course, the flow of gas to the injector and the pilot light is regulated by the main valve 12 described above and the valve 15 respectively, regulating admission of gas to the pilot light 16.

In order to hold the main valve 12 in closed position, I provide the spring member 14 as clearly shown in Fig. 1; this spring 14 presses against one lever arm of the double-armed lever 13; this lever arm in turn presses against the upper face of valve 12. The double-armed safety lever 13 ocillates, as shown, about a pivot arranged so that the lever arms of lever 13 are of substantially equal length.

The valve 15 of the pilot light 16 is combined with a spring permanently tending to close this valve, and can open only under the action of the thermostat 22 if the same is heated by the flame of the pilot light 16 as will be described farther below in detail.

The thermostat 22 mentioned in the preceding paragraph has the shape of a bent band with two arms of unequal length, the shorter of which is firmly secured to the inner face of the top wall of the housing of the regulating device, and the longer one of which is carrying the regulating screw 17 adapted to press against and thus act upon the valve 15 of the pilot light 16.

The band-shaped thermostat 22 is provided near the regulating screw 17 with a small bend or projection 18 adapted to engage the lower end of the regulating screw 20, which in turn is carried by the oscillatable shaft 21 of the lighting device. Shaft 21 is operated by the lighting lever 56 as best seen in Fig. 5.

The upper part of the housing 19 containing the regulating means described in the preceding paragraph is firmly secured by means of four little posts 23 to the front face of the combustion chamber 26 of the radiator. However, in order to protect the regulating device against the heat radiation of the combustion chamber during operation of the radiator, a heat reflecting metallic screen 24 having highly polished sides and insulating asbestos washers 25 are secured by the posts 23 to the front wall of the combustion chamber 26, parallel thereto.

The length of the securing posts 23 and the size and shape of the thermostat 22 are chosen so that the semi-circular bent portion of the thermo-couple is located substantially in the center of the free space within the housing 19, between the reflecting screen 24 and the top wall of the housing.

Furthermore, the thermostat 22 is located slightly above the direction of the flame of the pilot light 16, which flame is entering the combustion chamber through an opening provided in the reflecting screen 24 as shown in Figs. 1 and 5.

The pilot light 16 and the opening in the screen 24 are arranged so as to enable the flame of the pilot light to ignite the gas escaping from the burners 30 which are located approximately in the axis of the combustion chamber 26, equally spaced from the walls thereof. The burners 30 form part of a general burner device, which includes also a mixer chamber 31 of usual shape into which the main gas supply is fed by the injector 32. This mixing chamber is also provided as clearly shown in Fig. 1 at its bottom with an additional opening for admission of supplementary air so as to obtain the optimal gas-air mixture necessary for proper operation of the burners 30.

The valve 12 is combined as set forth above, with a spring 14 permanently tending to close this valve. Furthermore, valve 12 is also under the action of its own weight and the pressure of the gas present in the chamber 11, both tending to close valve 12 and to keep it closed. The valve 12 is simultaneously, however, also under the action of the thermostat 37 acting upon valve 12 through the intermediary of piston 38 and tending to open this valve under certain circumstances which will be described farther below in detail.

Piston 38 is provided as shown, with packing grooves, and cooperates with a thin rod-shaped member 39, which is supported at its lower end by the adjusting screw 42, firmly secured to the thermostat 37.

The thermostat 37 is firmly secured at its right end to the frame 35, which in turn is turnably pivoted to shaft 34 carried by the second frame 36. This second frame 36 in turn is rigidly attached to the bottom wall 51 of the housing containing the regulating device.

Figure 2:
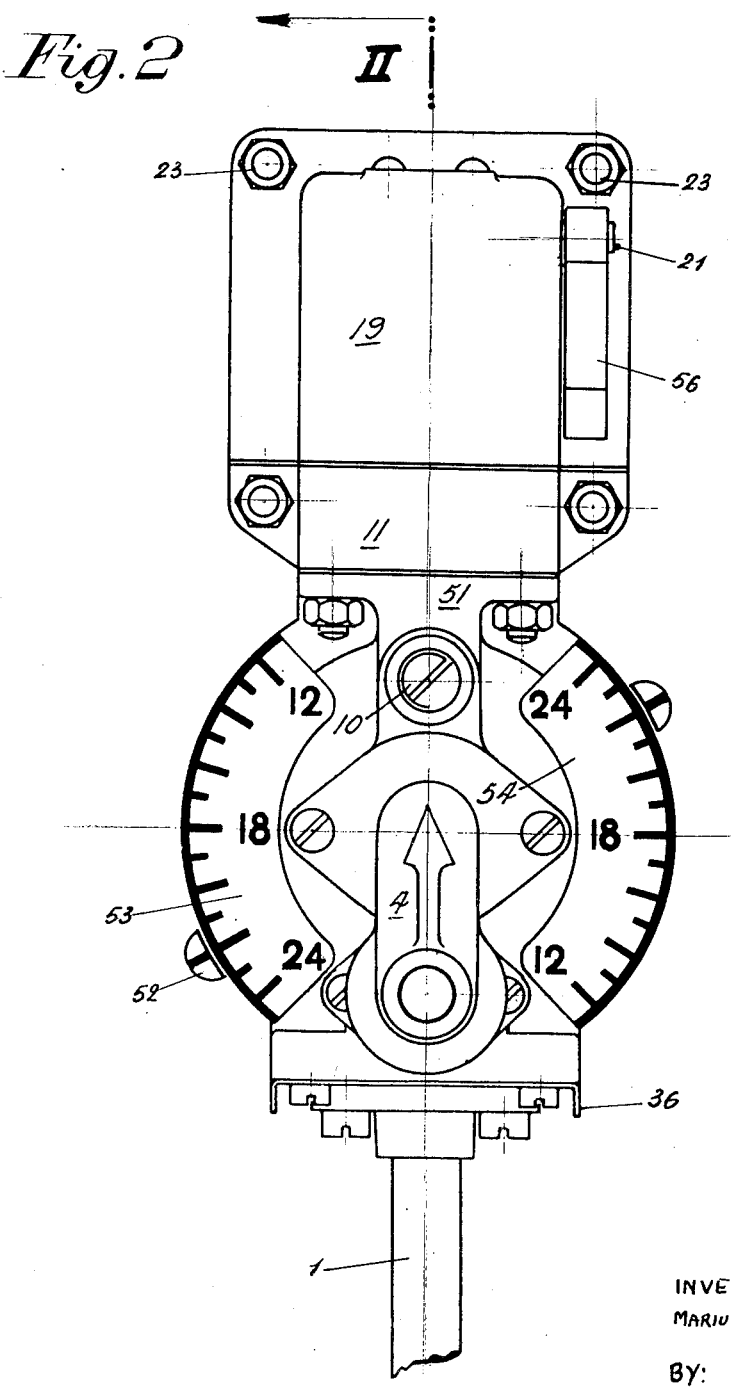
Fig. 2 is a front view of the lighting means for the pilot light.
Figure 3:
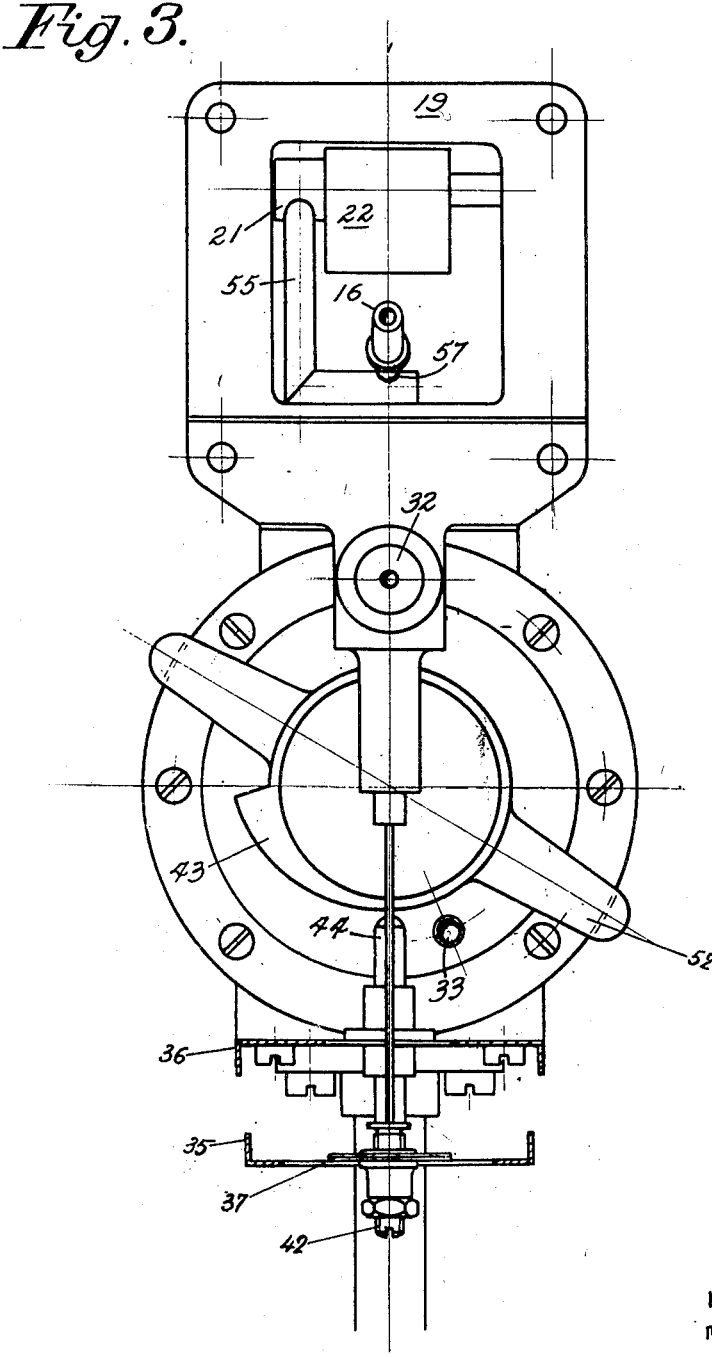
Fig. 3 is a rear view of the lighting means.

Of course, thermostat 37 is secured only at its right end to frame 35 and is in order to be able to carry out the necessary adjusting movements, entirely free at its left end which is carrying the regulating screw 42 as described above. In order to hold the thermostat 37 in proper position, the pivoted frame 35 is pulled at its left end upward by the spring 45 so as to press against the rod-shaped member 44, the vertical displacement of which is controlled by an eccentric cam 43 turnably carried by a cylindrical surface portion of the regulator housing 46 as clearly shown in Fig. 3. The cam 43 is provided with two arms 52 shown in Fig. 3 and adapted to move like indicating needles or pointers in front of the two symmetrical dials 53 and 54 graduated for temperature, as shown in Fig. 2.

In order to prevent oscillation of the thermostat 37, of the needle-shaped rod 39, of the piston 38 and of valve 12, I attach to the thermostat 37 near the adjusting screw 42 a leaf spring 41, permanently pressing against the vertical friction member 40, preventing thereby undesired oscillating movements of the entire system.

The pressure regulator is composed, as already mentioned above, of the valve 8 and the safety valve 49 both carried by the membrane 9. This membrane 9 is supported at its center by two metallic discs and held along its circular peripheral edge between the lower portion 51 of the regulator housing and the cover 46 of the pressure regulator.

The pressure regulator unit composed of the two valves 8 and 49 and the two discs holding the membrane 9 together with the tubular shaft connecting the two valves to each other, is adapted to slide along the guiding pin 50 which in turn is firmly secured to the cover 46 of the pressure regulator.

Furthermore, there is provided between the two discs holding the membrane 9 and the cover 46 of the pressure regulator a spring 48 tending to move the entire unit against pressure of the gas, so as to close valve 49. This spring 48 is combined with nut 47 which is screwed on a threaded portion of the guide pin 50 so as to enable adjustment of the pressure exerted by the spring.

The equalizing duct 33 is connected at its one end with the chamber within the housing of the pressure regulator and at its other end with the pipe 29, assuring atmospheric pressure within the chamber in the pressure regulator. Furthermore, this equalizing duct 33 permits the escape of any heating gas which might leak through the membrane 9 in case the same cracks or breaks. The Figs. 2, 3, 4 and 5 illustrate the lighting means for the pilot light. A freely turnable shaft 21 carries the regulating screw 20 and the lighting tube 55, which has two end portions bent at right angles. One of the end portions of the tube is coaxial with and arranged within the shaft 21 and the lighting lever 56 serving for turning the shaft, the other bent end portion of the tube 55 is provided with a hole 57 and is turnable together with the tube 55 from the position 57 shown in Fig. 1 in full lines, to the position 57a shown in dotted lines.

My above described regulating device operates as follows:

In inoperative position, i. e. when the burner is not lit, the cock valve 2 is closed and its handle 4 in horizontal position. Due to the fact that this valve is closed, there is no gas pressure in the chamber which contains the filter 5; consequently the spring 48 of the pressure regulator pushes the movable membrane unit of this regulator towards the left. In this position, the valve 8 forming part of this membrane unit is wide open and its left end very near to the restarting push button 7 without, however, touching the same. In this position of the pressure regulator, the safety valve 49 forming part of the membrane unit is closed, preventing passage of gas into the chamber 11.

Furthermore, in this position the spring 14 keeps the main valve 12 closed, because its tension is substantially greater than the opposing force which the thermocouple 37 is adapted to exert in upward direction on the valve, even if the ambient temperature is very low.

In this inoperative position, the valve 15 of the pilot light 16 is also closed and there is a small distance between the bottom face of the valve 15 and the left lever arm of the double-armed safety lever 13. Similarly, there is a free space between the top end of the valve 15 and the regulating screw 17 which is secured to the thermocouple 22. However, the play between the upper end of valve 15 and the regulating screw 17 is smaller than the play between the bottom end of this valve and the double-armed lever 13.

Finally, in this inoperative position of the device, the lighting lever is positioned so that the screw 20 carried by the same does not contact the thermostat 22; this screw 20 is adjusted so that any turning of the shaft 21 in counter-clockwise direction causes the screw to press against the thermostat 22, forcing the same downward into contact with the upper end of valve 15.

Thus, in inoperative position, both valves 12 and 15 are closed and no gas is admitted to the injector 32 and the pilot light 16.

In order to light the apparatus, the handle 4 of the cock valve 2 is turned by 90° so as to assume a vertical position. During this turning of the handle the restarting push button is pushed by the handle inward. However, such pushing effect of the handle is limited, since as explained above, in open position of the valve, a cavity in the handle is facing the left end of the push button 7. Thus, as soon as the handle 4 reaches its open position the restarting push button 7 returns into its initial position. Such a return movement of the push button is due to the spring combined with the push button.

This back and forth oscillating motion of the restarting button 7 causes in turn opening of the safety valve 49; the pressure of the gas entering through valve 2 into the left side chamber of the pressure regulator and from there into chamber 11, keeps the safety valve 49 open against action of the spring tending to move the entire membrane unit into left direction. This is due to the fact that the surface of the membrane 9 is much greater than the surface of the valve 49. Thus, the pressure of the gas exerted on valve 49 is insufficient to open the same against action of spring 48, but the action of the gas pressure upon the entire membrane 9 after opening of valve 49 is greater than the pressure of spring 48, thus keeping the entire membrane unit in a position in which the safety valve 49 is open.

After the handle 4 is turned as explained above, causing opening of the safety valve 49, the lighting lever 56 is manually turned. Such turning of the lighting lever 56 causes turning of the shaft 21 of the lighting device in counter-clockwise direction. Turning of shaft 21 in this direction in turn has two effects: First, the screw 20 secured to shaft 21 presses against the projection 80 pushing the free end of the thermostat 22 downward. This downward motion of the thermostat 22 causes opening of the valve 15 of the pilot light without however, the valve contacting the left lever arm of the double-armed lever 13. Furthermore, turning movement of the lighting lever 56 and turning of shaft 21 result in turning of the lighting tube from its position shown in Fig. 1 in full lines, and indicated with reference numeral 57 into its position shown in the same figure in dotted lines, and indicated with reference numeral 57a.

In this latter position, the valve 15 is open, admitting a stream of gas into the pilot light 16.

The operation of my new regulating device is protected by the following safety means:

1. If the gas pressure in the main pipe 1 is higher than the gas pressure necessary in the radiator, the pressure regulator automatically acts to reduce it to the correct predetermined temperature pressure; in this manner it is possible to avoid an excessive flow of gas through the pilot light 16 and the injector 32, and to avoid the consequence of such excessive gas flow, namely, the overheating of the combustion chamber 26.

2. If the delivery of gas in the main pipe 1 should accidentally fail, or if the gas pressure in the main pipe should become too low, the gas pressure which is exercised on the membrane 9 becomes insufficient to overcome the pressure of spring 48 and the safety valve 49 closes under the action of this spring; valve 49 remains closed even if the gas pressure returns in the main pipe 1 because, as explained above, the action of the gas pressure on the surface of the safety valve 49 is insufficient to overcome the pressure of spring 48 which is calculated so as to balance the action of this same pressure on the total surface of membrane 9 which is very much greater than that of the safety valve 49. Closing of the safety valve 49 interrupts the admittance of gas to the burners 30 extinguishing the same, and the pilot light 16 which in succession causes closing of the main valve 12 and closing of the valve 15, depending upon the extent of cooling of the thermostat 22. Relighting of the radiator is only possible by operating the handle 4, i. e. by turning the same to and fro by 90° which causes through the intermediary of the restarting push button 7, reopening of the safety valve 49 and re-admission of gas under pressure.

3. During lighting of the radiator, no gas is admitted to the injector 32 and the burners 30 so long as the pilot light 16 is not properly lighted: This is due to the fact that the pilot light is heating the thermostat 22 causing turning of the lever 13, which in turn permits the main valve 12 to open and admit gas to the injector 32.

4. If the pilot light should be extinguished accidentally for any reason whatsoever, all supply of gas to the burners 30 and the pilot light 16 would cease. This is due to the fact that after extinguishing of the pilot light 16, the thermostat 22 would be cooled by the current of air passing through between the regulating device and the reflecting screen 24; this cooling of the thermostat 22 results in upward turn of the free end thereof which, as explained above, permits the left lever arm of safety lever 12 to turn upward, freeing thereby spring 14 to close the main valve 12 and to close also through the intermediary of lever 13, the pilot light valve 15.

5. If for any reason, e. g. due to a defect or obstruction in the flue, a back pressure in the flue develops the combustion gases which are very hot would have to escape through the ventilating pipe 29 passing on its way to the same along the bottom of the damper 28. Thus, such combustion gases would come into contact with the thermostat 31, and the latter, suddenly heated, would immediately close the main valve 12 and thus abruptly interrupt any gas supply to the burners 30. In this way continuous discharge of combustion gases into the room to be heated is safely avoided.

It will be noted that the various elements of my new regulating device are arranged so that the entire unit can be easily removed from the radiator by simply unscrewing the nuts which secure the entire device to the small posts 23 described above. Thus, replacement of a defective regulating device by a properly operating one is very easy.

It will be understood that each of the elements described above, or two or more together, may also find a useful application in other types of regulating devices differing from the type described above.

While I have illustrated and described the invention as embodied in regulating devices for gas radiators, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What I claim as new and desire to secure by Letters Patent is:

1. In a regulating device for gas radiators comprising an outer casing, gas supplying means, burner means and a gas conduit connecting said supplying means and said gas burner means, in combination, a diaphragm arranged in said gas conduit and adapted to be deflected in one direction by the pressure of the gas passing through said conduit; an automatic valve mounted on said diaphragm and arranged in said gas conduit for regulating the flow of gas in said conduit corresponding to the pressure exerted on said diaphragm by the gas, said diaphragm being responsive to the gas pressure in said gas conduit on the burner side of said automatic valve; a safety valve mounted on said diaphragm and disposed in said gas conduit adapted to interrupt the flow of gas through said conduit when said diaphragm is deflected in opposite direction; spring means urging said diaphragm together with said valves in said opposite direction tending to close said safety valve against the pressure exerted on said diaphragm by the gas; and manually operated means air-tightly passing through said casing and projecting into said gas conduit, said manually operated means engaging in one position thereof said safety valve for opening said safety valve against the action of said spring means.

2. In a regulating device for gas radiators comprising an outer casing, gas supplying means, burner means, and a gas conduit connecting the gas supplying means and the burner means, in combination, a diaphragm disposed in said gas conduit adapted to be deflected in one direction by the pressure of the gas passing through the same; spring means urging said diaphragm in the opposite direction; a shaft secured to the center of said diaphragm and projecting therefrom into said gas conduit; regulating valve means arranged in said gas conduit mounted on said shaft and actuated by said diaphragm so as to decrease the flow of gas in proportion to the increase of gas pressure when said diaphragm is moved by an increased gas pressure against the action of said spring means, said diaphragm being responsive to the gas pressure in said gas conduit on the burner side of said regulating valve means; safety valve means disposed in said gas conduit mounted on said shaft actuated by said diaphragm and adapted to be closed by the action of said spring means when the gas pressure drops under a predetermined level; a spring-loaded push button mounted on said casing; a resetting stem projecting into said gas conduit and connected to and actuated by said push button to engage said shaft for opening said safety valve against the action of said spring means.

3. In a regulating device for gas radiators comprising supplying means, burner means, and a gas conduit connecting the gas supplying means and the burner means, in combination, a diaphragm disposed in said gas conduit adapted to be deflected in one direction by the pressure of the gas passing through the same; spring means urging said diaphragm in the opposite direction; a shaft secured to the center of said diaphragm and projecting therefrom into said gas conduit; regulating valve means arranged in said gas conduit mounted on said shaft and actuated by said diaphragm so as to decrease the flow of gas in proportion to the increase of gas pressure when said diaphragm is moved by an increased gas pressure against the action of said spring means, said diaphragm being responsive to the gas pressure in said gas conduit on the burner side of said regulating valve means; safety valve means disposed in said gas conduit mounted on said shaft actuated by said diaphragm and adapted to be closed by the action of said spring means when the gas pressure drops under a predetermined level; a manually operated valve adapted to open and close said gas supply means; and means operatively connected to said manually operated valve for opening said safety valve means whenever said manually operated valve is operated.

4. In a regulating device for gas radiators comprising gas supplying means, burner means, and a gas conduit connecting the gas supplying means and the burner means, in combination, a diaphragm disposed in said gas conduit adapted to be deflected in one direction by the pressure of the gas passing through the same; spring means urging said diaphragm in the opposite direction; a shaft secured to the center of said diaphragm and projecting therefrom into said gas conduit; regulating valve means arranged in said gas conduit mounted on said shaft and actuated by said diaphragm so as to decrease the flow of gas in proportion to the increase of gas pressure when said diaphragm is moved by an increased gas pressure against the action of said spring means, said diaphragm being responsive to the gas pressure in said gas conduit on the burner side of said regulating valve means; safety valve means disposed in said gas conduit mounted on said shaft actuated by said diaphragm and adapted to be closed by the action of said spring means when the gas pressure drops under a predetermined level; a manually operated cock valve disposed in said gas supply means and provided with a handle; and a spring-operated push button means arranged under said handle and adapted to be pressed against said shaft for opening said safety valve whenever said handle of said cock valve is operated.

5. In a regulating device for gas radiators comprising gas supplying means, burner means, and a gas conduit connecting the gas supplying means and the burner means, in combination, a diaphragm disposed in said gas conduit adapted to be deflected in one direction by the pressure of the gas passing through the same; spring means urging said diaphragm in the opposite direction; a shaft secured to the center of said diaphragm and projecting therefrom into said gas conduit; regulating valve means arranged in said gas conduit mounted on said shaft and actuated by said diaphragm so as to decrease the flow of gas in proportion to the increase of gas pressure when said diaphragm is moved by an increased gas pressure against the action of said spring means, said diaphragm being responsive to the gas pressure in said gas conduit on the burner side of said regulating valve means; safety valve means disposed in said gas conduit mounted on said shaft actuated by said diaphragm and adapted to be closed by the action of said spring means when the gas pressure drops under a predetermined level; a manually operated cock valve disposed in said gas supply means and provided with a handle formed with a recess; push button means disposed directly under said recess if said cock valve is in open position, and adapted to be axially displaced by the portions of said handle defining said recess when said handle is turned, said push button means extending coaxially with said shaft so as to axially displace said shaft in one direction for opening said safety valve whenever said handle is turned; and a spring means urging said push button member in the other direction away from said shaft, and into said recess if said cock valve is in open position.

MARIUS CLEMENT CARBONARO.

REFERENCES CITED

The following references are of record in the file of this patent:

UNITED STATES PATENTS

| Number | Name | Date |
|---|---|---|
| 1,612,114 | Hall | Dec. 28, 1926 |
| 2,183,569 | Hughes | Dec. 19, 1939 |
| 2,201,399 | Jackson | May 21, 1940 |
| 2,257,024 | Ray | Sept. 23, 1941 |
| 2,361,944 | Jackson | Nov. 7, 1944 |
| 2,457,378 | Johnson | Dec. 28, 1948 |

FOREIGN PATENTS

| Number | Country | Date |
|---|---|---|
| 178,045 | Switzerland | Sept. 16, 1935 |